(12) United States Patent
Patch

(10) Patent No.: US 7,918,407 B2
(45) Date of Patent: Apr. 5, 2011

(54) METHOD AND APPARATUS FOR CONTROL OF COOLING SYSTEM AIR QUALITY AND ENERGY CONSUMPTION

(76) Inventor: Ronald Harrison Patch, Hixson, TN (US)

(*) Notice: Subject to any disclaimer, the term of this patent is extended or adjusted under 35 U.S.C. 154(b) by 434 days.

(21) Appl. No.: 12/214,085

(22) Filed: Jun. 17, 2008

(65) Prior Publication Data
US 2009/0308941 A1    Dec. 17, 2009

(51) Int. Cl.
F24F 7/00 (2006.01)
F25D 17/00 (2006.01)
(52) U.S. Cl. .................. 236/49.3; 62/178; 62/186
(58) Field of Classification Search ............ 236/49.3; 62/177, 178, 180, 186
See application file for complete search history.

(56) References Cited

U.S. PATENT DOCUMENTS

| | | | |
|---|---|---|---|
| 4,364,237 A | 12/1982 | Cooper et al. | |
| 4,589,475 A | 5/1986 | Jones | |
| 4,619,114 A | 10/1986 | Wilson | |
| 4,803,848 A | 2/1989 | LaBrecque | |
| 5,192,464 A | 3/1993 | Pawlowski et al. | |
| 5,303,561 A | 4/1994 | Bahel et al. | |
| 5,309,725 A | 5/1994 | Cayce | |
| 5,947,854 A | 9/1999 | Kopko | |
| 6,257,007 B1 | 7/2001 | Hartman | |
| 6,679,072 B2 | 1/2004 | Pham et al. | |
| 6,695,046 B1 | 2/2004 | Byrnes et al. | |
| 6,826,920 B2 | 12/2004 | Wacker | |
| 6,968,708 B2 | 11/2005 | Gopalnarayanan et al. | |
| 7,031,154 B2 | 4/2006 | Bash et al. | |
| 7,191,826 B2 | 3/2007 | Byrnes et al. | |
| 7,246,500 B2 | 7/2007 | Singh et al. | |
| 7,434,413 B2 * | 10/2008 | Wruck | 62/126 |
| 2003/0094004 A1 | 5/2003 | Pham et al. | |

(Continued)

OTHER PUBLICATIONS

Title of Item: The Application of Electronic Variable Speed Drives To Small Packaged Rooftop HVAC Units; date Jan. 10, 2005; pp. 1-5.
AAON Title: Single Zone VAV Discover how to save money, reduce energy consumption and lower sound levels. Brochure published on AAON webpage in 2010.

*Primary Examiner* — Marc E Norman
(74) *Attorney, Agent, or Firm* — Baker, Donelson, Bearman, Caldwell & Berkowitz, PC; Micheline Kelly Johnson

(57) ABSTRACT

An energy saving air quality control system modulates supply fan speed by use of controlled, variable-frequency drive controls for automatic dampers or suction pressure to maintain adequate air flow across the evaporator coil at partial cooling loads. Demand ventilation in the system balances air quality and energy consumption by controlling the outdoor air damper in response to indoor $CO_2$ levels. The control system variously either (1) produces a variable 0-10 VDC output signal to modulate the outside ventilation air damper as required to keep the $CO_2$ concentration below a set point; (2) produces a 0 or 24 VAC signal to either open or close a two-position outside air damper for as long a time period as is required in order to keep the $CO_2$ concentration below a set point; or (3) allows manually setting the outside air damper to provide proper ventilation air at maximum occupancy and maximum air flow and modulates the supply fan speed as required to keep the CO2 concentration as measured by a CO2 monitor below set point.

22 Claims, 12 Drawing Sheets

U.S. PATENT DOCUMENTS

| | | |
|---|---|---|
| 2006/0112703 A1 | 6/2006 | Singh et al. |
| 2006/0130504 A1 | 6/2006 | Agrawal et al. |
| 2006/0288714 A1 | 12/2006 | Joyner |
| 2007/0033957 A1 | 2/2007 | Taras et al. |
| 2009/0192650 A1 | 7/2009 | Tonner |
| 2009/0236432 A1* | 9/2009 | Malloy ........................ 236/49.3 |

* cited by examiner

Affinity Laws

Flow α speed: $(RPM_1/RPM_2)=(GPM_1/GPM_2)=(CFM_1/CFM_2)$

Pressure α speed$^2$: $(\Delta P_1/\Delta P_2)=(RPM_1/RPM_2)^2=(GPM_1/GPM_2)=(CFM_1/CFM_2)^2$ Power α speed$^3$: $(HP_1/HP_2)=(RPM_1/RPM_2)^3=(GPM_1/GPM_2)=(CFM_1/CFM_2)^3$

FIG 1

Variable Airflow Control Savings

| % Airflow Reduction | % HP Reduction |
|---|---|
| 10% | 27.10% |
| 20% | 48.80% |
| 30% | 65.70% |
| 40% | 78.40% |
| 50% | 87.50% |
| 60% | 93.60% |

FIG 2

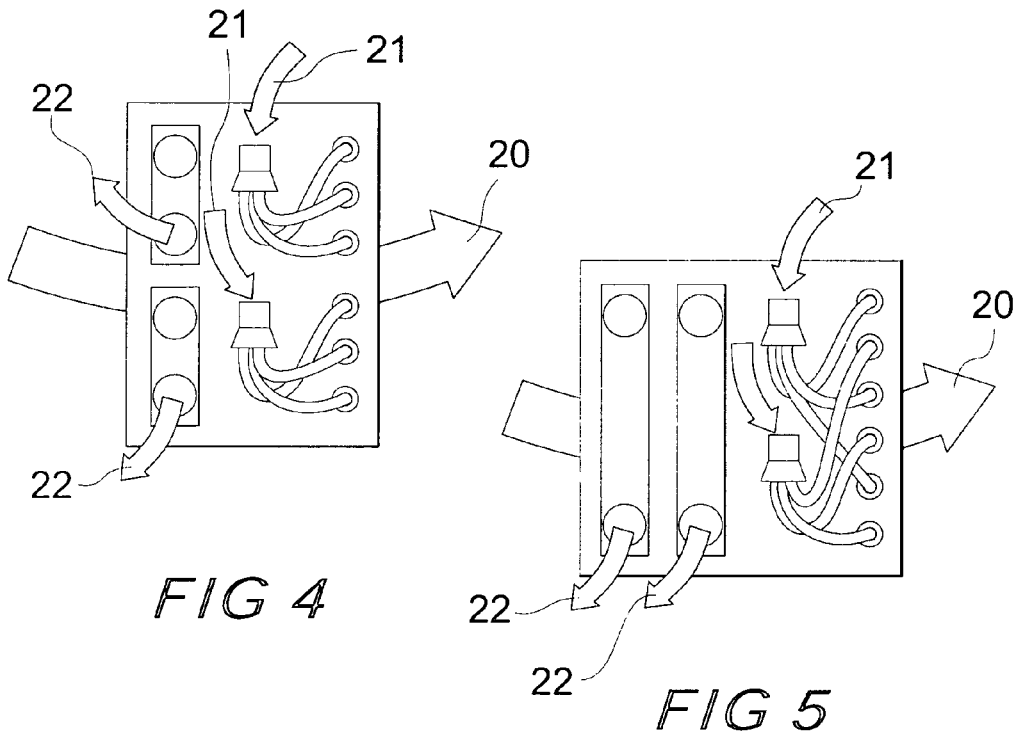
FIG 4
FIG 5
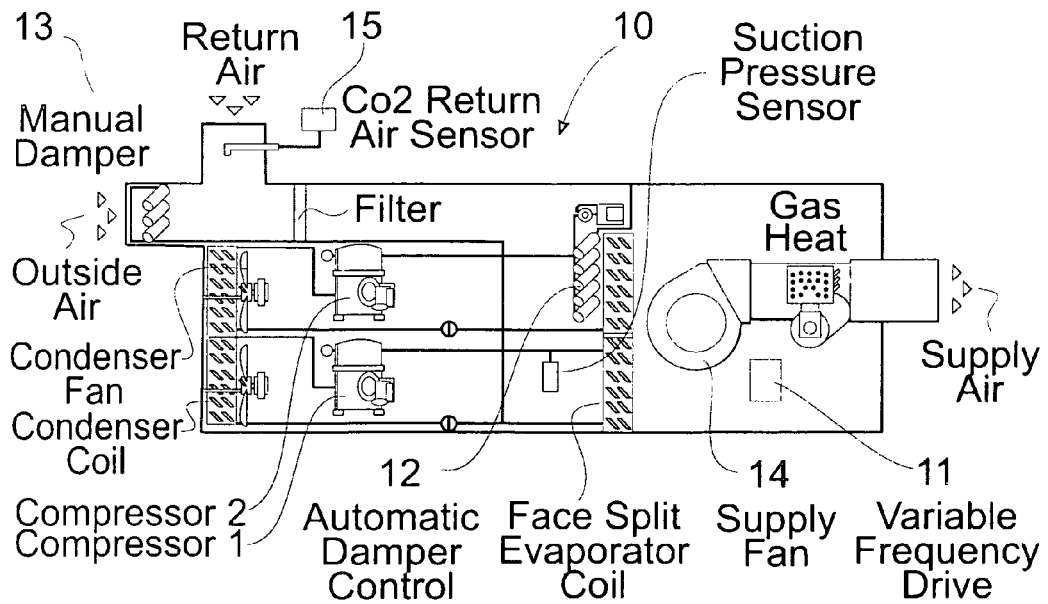
FIG 6

METHOD AND APPARATUS FOR CONTROL OF COOLING SYSTEM AIR QUALITY AND ENERGY CONSUMPTION

FIELD OF THE INVENTION

The present invention pertains to a control system for varying the speed of a fan drive motor for a forced air indoor space heating/cooling system during all modes of operation of the heating/cooling system.

BACKGROUND OF THE INVENTION

Single-zone rooftop units have been used worldwide for the last 40 years on small office buildings, shopping malls, and retail stores. Single-zone air conditioning units have long been the lowest first-cost method of air conditioning buildings. The operating cost (energy use) of the systems has not been a significant consideration until recently, with the current focus on energy consumption and its link to both global warming and increased costs.

As air conditioning units go, single-zone package units have been considered to be a commodity item and, as such, they have limited sophistication when it comes to energy saving features. Current state-of-the-art air conditioning units are becoming more energy efficient by using variable airflow, improved heat transfer surfaces, more efficient fans, and more efficient compressors, but no retrofit exists for the literally millions of existing air conditioning units that could operate with less energy without sacrificing comfort. A retrofit is needed that may be applied to any brand of rooftop unit with gas, electric, or reverse cycle (heat pump) heat.

SUMMARY OF THE INVENTION

The present invention provides an improved fan or blower drive motor control system for a forced air heating/cooling system wherein a control circuit is provided that varies the speed of the fan drive motor during all modes of the heating/cooling system's operation. The control system may be easily adapted to retrofit conventional heating/cooling system controls to vary the forced air fan or blower drive motor speed in response to all operation modes of the system as well as the $CO_2$ level sensed within the air flow circuit. The control system is particularly adapted for but not limited to use with rooftop heating/cooling systems.

The control system includes a power supply and a control for the drive motor speed. The control system also includes a circuit for detecting $CO_2$ concentration and a circuit that provides for driving motor speed in response to the $CO_2$ levels detected.

The control systems of the present invention advantageously reduce energy consumption of conventional forced air heating and cooling systems, hot and cold air drafts, noise associated with fan or blower operation, and indoor $CO_2$ levels.

Those skilled in the art will further appreciate the important features and advantages of the invention upon reading the detailed description of the preferred embodiments hereof that follows with reference to the accompanying drawings.

BRIEF DESCRIPTION OF THE DRAWINGS

FIG. 1 is an illustration of the Affinity Laws governing air flow mechanics.

FIG. 2 is a chart showing the relationship between airflow reduction and horsepower reduction.

FIG. 4 is an illustration of DX coils that are face-split circuited.

FIG. 5 is an illustration of DX coils that are interlaced circuited.

FIG. 6 is an illustration of a single zone rooftop forced air heating/cooling unit with face-split coils, a variable frequency drive, face damper, CO2 sensor, and demand ventilation according to the third option discussed herein for use with either the first or the second preferred embodiments of the instant invention.

DETAILED DESCRIPTION OF PREFERRED EMBODIMENTS

Figure 3:
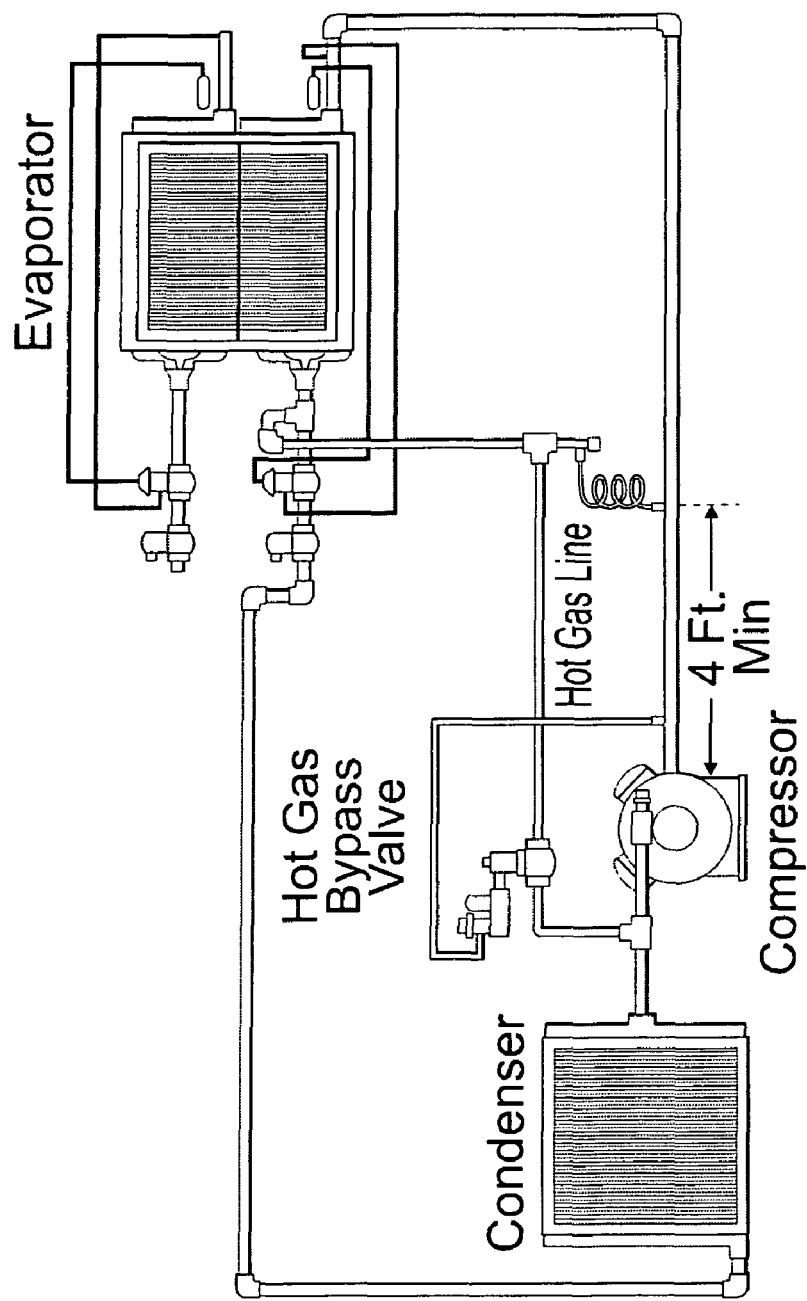
FIG. 3 is an illustration of hot gas bypass of the prior art.

In the description that follows, like elements are marked throughout the specification and the drawings with the same reference numerals.

DETAILED DESCRIPTION

The purpose of the control system of the present invention is to provide an energy-conserving retrofit for existing rooftop forced air heating/cooling systems to vary the speed of the fan drive motor during all modes of the heating/cooling system's operation. The present invention may be installed in a rooftop forced air heating/cooling system with no modification to either the existing thermostat and temperature control system, or more importantly, the internal refrigerant system.

One of the energy-saving features of the present invention is that it changes the speed of the supply fan based on the operating mode of the unit. There are typically a maximum of five operating modes of a commercial single zone rooftop air conditioning unit. The modes are deadband, when only the unit supplier fan is running; first and second stage cooling; and first and second stage heating. Depending on the capacity of the rooftop unit, the number of cooling and heating stages may vary. The controller of the present invention has several embodiments, each programmed to match the specific unit it will control.

Referring to FIG. 1, the Affinity Laws provide that the horsepower varies as the cube of the ratio of the airflows. This relationship results in significant supply fan energy savings when utilized by the controller of the present invention. Since motor power is a function of shaft load, and shaft load is a function of flow and pressure, reducing flow can reduce power significantly. Referring now to FIG. 2, and applying the Affinity Laws, the horsepower can be reduced by 27.1% at 10% airflow reduction to 93.6% at 40% airflow reduction.

There is a sound technical basis for varying the airflow being delivered to the occupied space as the operating mode changes. During the occupied mode, an air conditioning/heating unit-operating mode varies as the cooling and heating loads change. The load changes are caused by variations in weather, number of people, and internal load variations such as lighting, computers, and the like in the conditioned space. Typically the volume of airflow delivered to the occupied space is calculated assuming the outdoor weather condition is the warmest and the most humid day of the year, and that at the same time, the maximum number of people are in the occupied space, and that the maximum number of lights and other internal loads are on.

In reality, the likelihood that all of the previously mentioned conditions would actually occur simultaneously is either small (5% of the time or less) or non-existent. The required maximum airflow for cooling is calculated using the following equation:

$$\text{Fan cfm} = Q/1.08 \times (t_1 t_2)$$

Fan cfm is the cubic feet per minute of conditioned air delivered to the conditioned space by the supply fan.

Q=The total room sensible heat (heat from building ceiling, wall, floor, glass transmission, people, lights, and other internal sensible heat sources measured in Btu's (British thermal units) per hour. Sensible heat is defined as the heat absorbed or evolved by a substance during a change of temperature that is not accompanied by a change of state.

1.08=a constant that is based on the properties of air.

$t_1$=the required space design dry bulb temperature.

$t_2$=the dry bulb temperature leaving the cooling coil in the rooftop forced air heating/cooling system.

In normal comfort cooling applications, the cooling cfm is much larger than the heat cfm, so the cooling cfm is selected for the design rooftop unit airflow exercise here.

Based on the equation, if the room's sensible heat drops, the airflow will drop proportionally, i.e., 50% of the room sensible heat requires 50% of the airflow. While most of the current state-of-the-art air conditioning systems used in upscale office buildings vary the airflow to match the varying load, single-zone rooftop equipment that has been used for years on most small office buildings, shopping malls, and retail stores deliver the maximum airflow to the conditioned space anytime the space is occupied during business hours. This not only uses more electrical energy to run the fan, but it also tends to have an undesirable effect on comfort and indoor relative humidity. When the rooftop unit is in the heating or deadband mode, maximum airflow delivery to the conditioned space often feels uncomfortably drafty to the occupants.

Retrofits that reduce the airflow on single-zone rooftop forced air heating/cooling systems in the heating and deadband (sometimes referred to as "ventilation") modes have been used with some success in some retail facilities in the past.

However, there are several distinct differences between the present invention and designs of the prior art. One difference between these previous designs and the present invention is that the present invention varies the airflow in the cooling mode as well as the heating and deadband modes. In most small offices, retail stores, and shopping malls, the great majority of operating hours, and therefore the most energy saving opportunities, are during the cooling mode. The reason that most of the operating hours are in the cooling mode is that the internal heat gains typically more than offset the building transmission losses even in cool weather, thus cooling is required.

The reason variable airflow has not been used successfully in the cooling mode is that typical single-zone rooftop units, which use direct expansion (DX) cooling coils, can have operational problems if the airflow is varied at partial cooling loads without taking the proper precautions to protect the refrigeration components. The problem is that low refrigerant operating pressure can cause nuisance safety trip-outs, coil icing, and in some cases, compressor damage through refrigerant liquid slugging and compressor short-cycling.

Referring now to FIG. 3, the complexity required by the prior art of hot gas bypass is demonstrated. In applications where variable airflow in rooftop air conditioning units is required, as in terminal variable air volume systems, the industry practice has been to employ discharge air temperature control in conjunction with refrigerant hot gas bypass. The discharge air temperature is used to stage compressors so that a reasonably constant discharge air temperature is maintained. The supply fan is modulated with a variable frequency drive to maintain a constant duct static pressure. The refrigerant hot gas bypass uses hot gas from the discharge side of the compressor to falsely load the evaporator coil. This false loading prevents the low refrigerant operating pressures and its accompanying problems mentioned previously. The hot gas bypass requires special modulating control valves as well as special refrigerant piping to be added to the rooftop unit. Adding hot gas bypass to a rooftop unit not only adds considerable first cost to the unit, but the false loading of the evaporator coil wastes energy. Hot gas bypass is complicated to install, complicated to commission, and should be serviced only by upper echelon air conditioning service technicians. The type of unit just described is an expensive special-purpose unit and is very different from the existing single-zone units that would be found on small offices, malls, and retail stores. It would be very safe to say that none of the thousands and thousands of rooftop single-zone units on small offices, malls, and retail stores have variable airflow capability nor do they have hot gas bypass.

A major difference between previous air conditioning methodology and the present invention is the way in which the inherent problems of variable airflow with DX cooling coils are solved. This is a key difference that allows the present invention to be cost effective to buy and install, as well as energy efficient. Referring now to FIGS. 4 and 5, DX coils that have multiple compressors are generally circuited one of two ways, face split or interlaced. The direction of air flow is represented by arrow 20; the direction of flow of liquid refrigerant is represented by arrow 21; and the direction of refrigerant suction is represented by arrow 22. Based on the coil circuiting of a particular rooftop unit, the present invention employs different control strategies to protect the refrigeration system from encountering low refrigerant pressure.

In a first embodiment of the present invention for use with face split coils, automatic control dampers are added to prevent air bypass through the de-energized coil face at partial cooling loads. The damper is only closed during partial cooling loads in order to keep the air pressure drop through the cooling coil to a minimum. This minimization of the air pressure drop further reduces the fan energy usage. The fan speed is indexed to proportionally match the face area of the energized coil, so the active coil face velocity is identical to the coil face velocity at maximum load. As a result, all the heat transfer characteristics of the active cooling coil are essentially unchanged. These characteristics are suction pressure, superheat, sub-cooling, sensible and latent cooling capacities, and airside pressure drop.

In a second embodiment of the present invention for use with interlaced coils, suction pressure control is used to maintain adequate airflow at partial loads. At partial load conditions, the fan speed is reduced in proportion to the remaining cooling capacity percentage. Depending on the amount of outside air being brought into the forced air heating/cooling system and the enthalpy of the outdoor air, there are times when the suction pressure could drop into the unacceptable ranges on an interlaced coil since the face velocity has been reduced by as much as half. In this case, the present invention increases the fan speed as required to maintain the suction temperature and therefore the suction pressure in the acceptable range. Neither of these two methods are currently employed in the air conditioning industry.

Regardless of the cooling coil circuiting, in either case, suction pressure will be maintained at acceptable levels without the use of expensive first cost, energy inefficient, and difficult to service, hot gas bypass used in the prior art. The use of the present invention on face split coils is more expensive and costs more to install than for the interlaced coil, due to the need to furnish and install a face damper and damper operator. On the other hand, the face split version of the present invention will save more energy than the interlaced version because the fan speed can be reduced further at part loads. However, the magnitude of the overall first cost difference and operating cost difference of the two embodiments is very small.

Because the present invention is much less complex than hot gas bypass, any light commercial air conditioning technician can easily service it. Further, if installation of hot gas bypass according to the prior art were a part of a retrofit package in lieu of the methodology of the present invention previously described, the first cost, installation cost, and energy savings would be such that it would likely make such a product not economically justifiable.

Another difference between the present invention and the prior art is the demand ventilation feature that is built in to the present invention. Besides the heightened awareness of producing and using energy more wisely, indoor air quality is a current health concern. As mentioned earlier, single-zone units historically have been low-cost, low feature products. The only way to address indoor air quality on these units has been a manual damper setting for the damper that controls the percentage of outdoor (ventilation) air that is allowed to be brought into the rooftop unit. If the damper setting allows too much outside air into the building to provide for adequate indoor air quality, the energy use of the unit is more than it needs to be. If the damper setting allows too little outside air into the building to provide adequate indoor air quality, the building is a candidate for what is now known as "Sick Building Syndrome." With regard to the amount of ventilation air that is brought into a building, saving energy and indoor air quality are at cross purposes. Improving one sacrifices the other, so in order to save energy and still have acceptable indoor air quality one should ventilate only as much as is necessary for acceptable indoor air quality, but no more than is necessary.

There are two primary methods of measuring indoor air quality, carbon dioxide sensors ($CO_2$) and volatile organic compound sensors (VOC). Since humans exhale $CO_2$, measuring the $CO_2$ levels in the space is a good indication of the people density and correspondingly, the indoor air quality. VOC sensors do not read $CO_2$, but can measure "most anything that smells." VOC sensors are better for measuring things such as off-gasses from new carpet and wallpaper, but there is not a finite way to quantify the measured values. As a result, $CO_2$ sensors have become the most commonly used method of measuring indoor air quality. Although there are several methods of determining the proper indoor $CO_2$ levels, a concentration of less than 1000 ppm (parts per million) is generally considered good indoor air quality.

Modulating the ventilation rate as required to maintain a maximum of 1000 ppm of $CO_2$ is called demand ventilation. The present invention has demand ventilation built into it and allows the end user to select from three different ways to implement it. Two of the methods are well known to the air conditioning industry, the third is unique to the present invention.

In all three cases, a $CO_2$ sensor is installed either in the conditioned space or in the rooftop unit return air stream. The present invention allows the end user to set the maximum desired $CO_2$ concentration level (generally 1000ppm). Using appropriately either the first or second embodiment of the invention as herein described, demand ventilation is achieved by adding one of the three options described below.

Option 1—The present invention produces a variable 0-10 VDC output signal to modulate the outside (ventilation) air damper as required to keep the $CO_2$ concentration below set point.

Option 2—The present invention produces a 0 or 24 VAC signal to either open or close a two-position outside air damper for as long a time period as is required in order to keep the $CO_2$ concentration below set point.

Option 3—Referring to FIG. 6, the outside air damper 13 is manually set to provide proper ventilation air at maximum occupancy and maximum airflow. At part load/reduced airflow conditions, which occur during 90% or more of the occupied hours, the outside air quantity will be reduced proportionally to the supply air volume.

At part load, the supply air volume is reduced to its normal level to match the cooling/heating/ventilation load. As long as the $CO_2$ level is below set point, the fan speed is indexed to its normal value. If the $CO_2$ level starts to approach the maximum $CO_2$, the fan speed is modulated upward. As the fan 14 is modulated upward, the outside air (ventilation) quantity is proportionally increased, which will reduce the $CO_2$ concentration. It is important to note that the fan speed is only increased above its normal speed as necessary to keep the $CO_2$ value at or below set point. Since all three options may be used with either embodiment of the present invention, the end user can decide which option and embodiment fits the particular first cost and energy consumption situation the best.

Option 1 has the highest initial cost, but it is also the most energy efficient. It will normally require that additional control hardware be added to the unit. This is currently the method of choice in the air conditioning industry and is used on more complex and expensive air conditioning units.

Option 2 is a little less expensive than Option 1 since it could possibly utilize some of the existing hardware on the unit, although additional wiring would be required. Energy efficiency will be slightly less than Option 1, and there will be larger swings in the space $CO_2$ levels since the control is on/off instead of modulating.

Option 3 is by far the least costly option of the three. There is no additional wiring or hardware as all of the central logic is built into the present invention. The accuracy of control is comparable to Option 1. This option is the least energy efficient of the three, however, the magnitude of that efficiency difference depends on the load profile of the area being served by the rooftop unit. Load profile takes into consideration the yearly outdoor weather, internal equipment and light loads, and most importantly, the occupancy density levels.

In small office buildings, the load profile is fairly consistent, except for the weather, but in shopping malls and retail stores, the largest variable is the people density. In those cases, the most likely factor to drive a rooftop unit to maximum cooling capacity is the people load, so in those cases, the energy downside of Option 3 is minimal at best because these buildings seldom reach maximum people density.

The reason Option 3 is an important part of the present invention retrofit is because it gives end users the opportunity to "get current" with the indoor air quality (IAQ) requirements with an affordable product. Having to add the complexity and cost inherent in Options 1 and 2 might prevent the end user from doing the retrofit at all. When energy and functionality are considered, on a scale of 1 to 10 with 10 being the best, Option 1 is a 10, Option 2 is a 9, and Option 3 is in the range of 7 to 10 depending on the load profile. When first cost and maintenance cost are considered, Option 1 is a 3, Option 2 is a 5, and Option 3 is a 10. The concept of Option 3 and the present invention retrofit in general matches with the concept of single-zone rooftop units in the first place, as lots of low-cost but functional rooftop units need lots of low-cost but effective retrofits.

Thus, again referring to FIG. 6, the present invention retrofit kit 10 consists of the following components:

1. Variable frequency drive 11 with controller;
2. Power wiring harness (not pictured);
3. Control wiring harness (not pictured);
4. Evaporator face damper 12 when required. Certain models of different brands of forced air heating/cooling systems may not require this damper. The physical size of the face damper varies depending on the exact manufacturer and model of the forced air heating/cooling system;
5. Face damper wiring harness (not pictured); and
6. A CO2 analog return sensor 15 in either the conditioned space or in the return air stream.

The benefits of varying the supply air volume during particular cooling loads include not only saving supply fan motor energy, but improving occupant comfort and indoor air quality. Compressor energy is also saved.

Additionally, a reduction of fan horsepower proportionally reduces the magnitude of the fan heat (kinetic energy) that is added to the air. The benefits of reduced fan heat are two-fold. First, less fan heat means less airflow to the conditioned spaces is required, which saves operating cost. Second, less fan heat reduces the required compressor load and saves operating cost.

Figure 7:
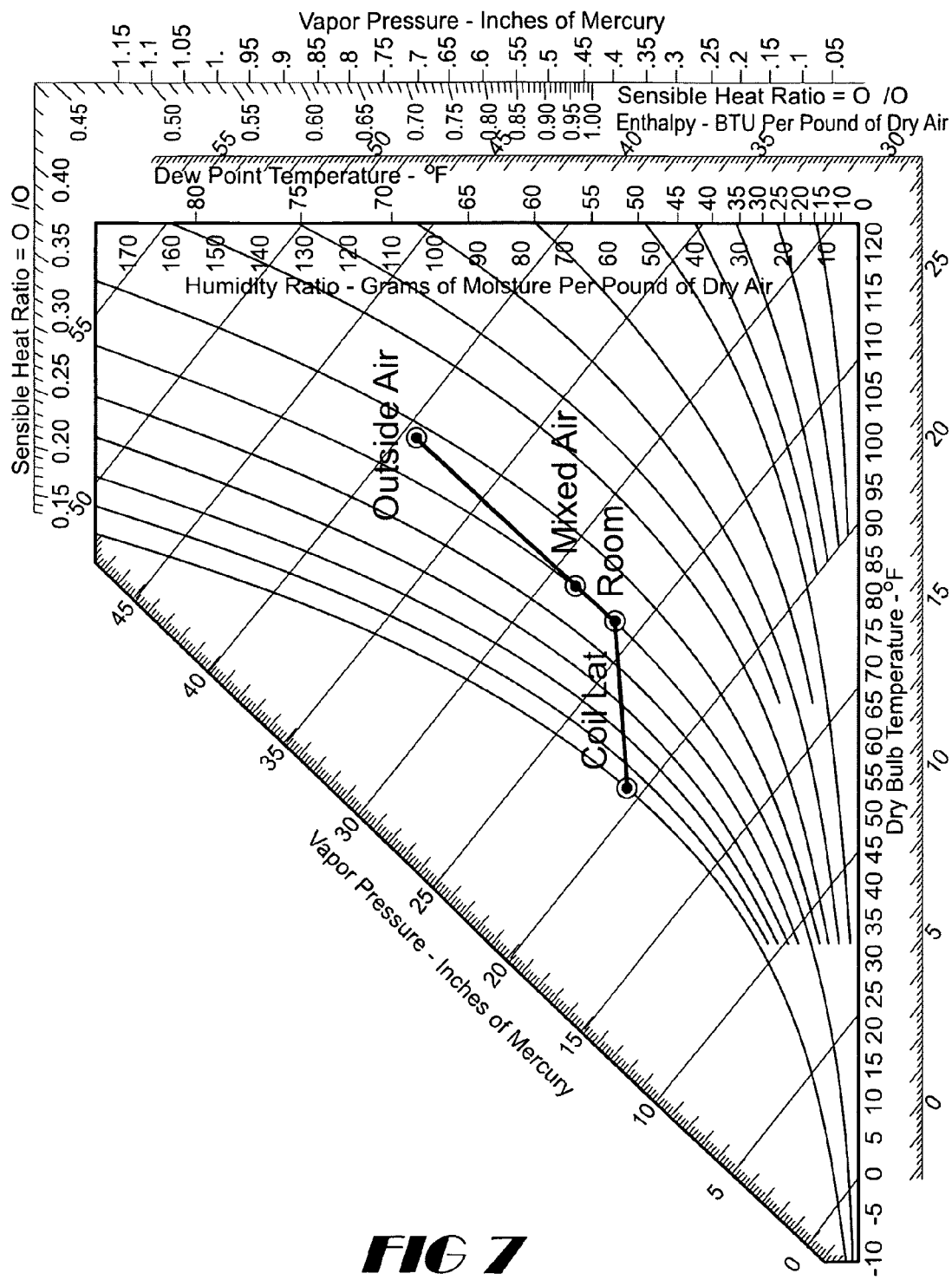
FIG. 7 is a psychrometric chart showing the temperatures of the mixed air entering and leaving a cooling coil pursuant to air handling by the system of the present invention.
Figure 8:
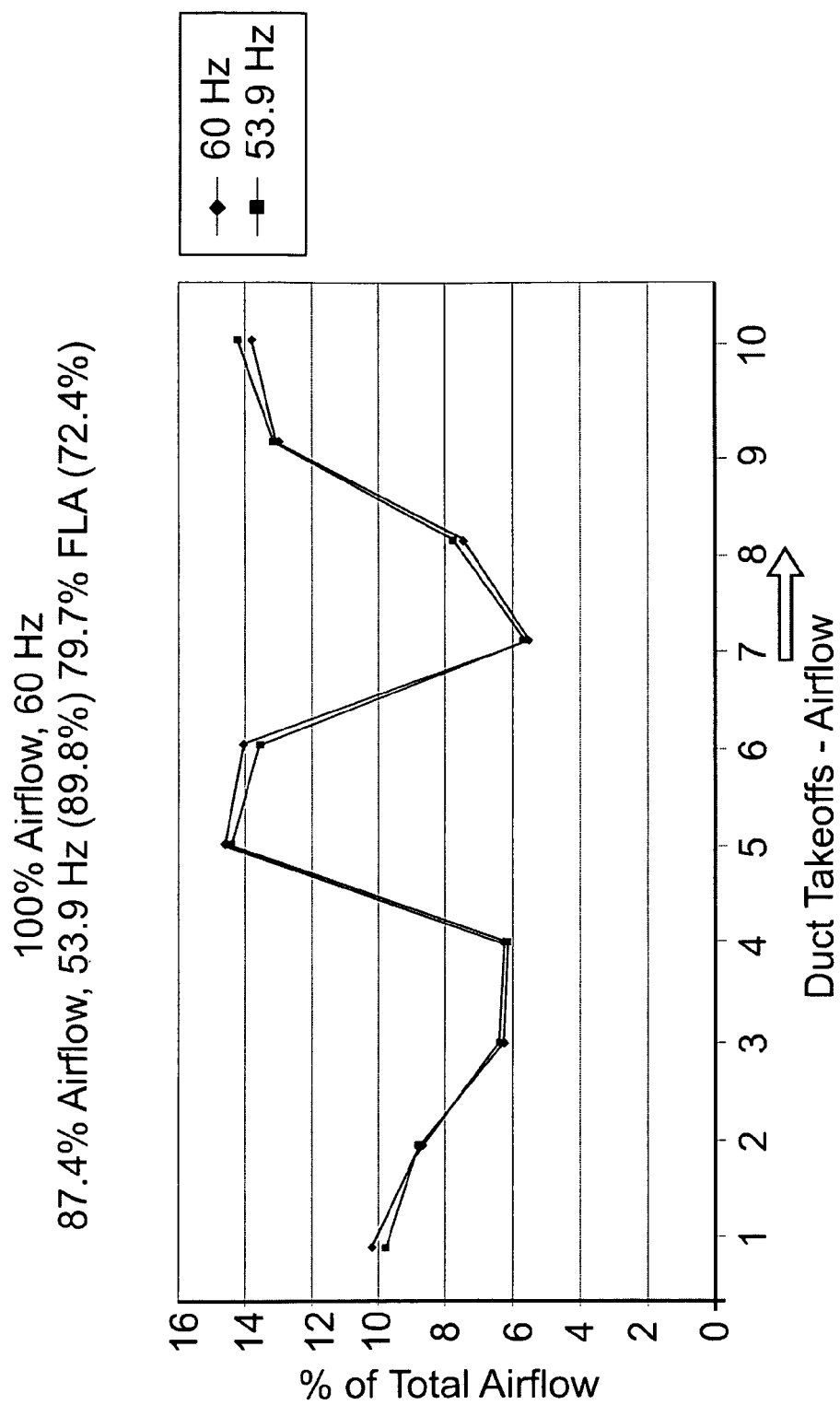
FIGS. 8-12 are graphs showing percent of total airflow at each outlet for each fan speed using the present invention, compared to maximum airflow.
Figure 9:
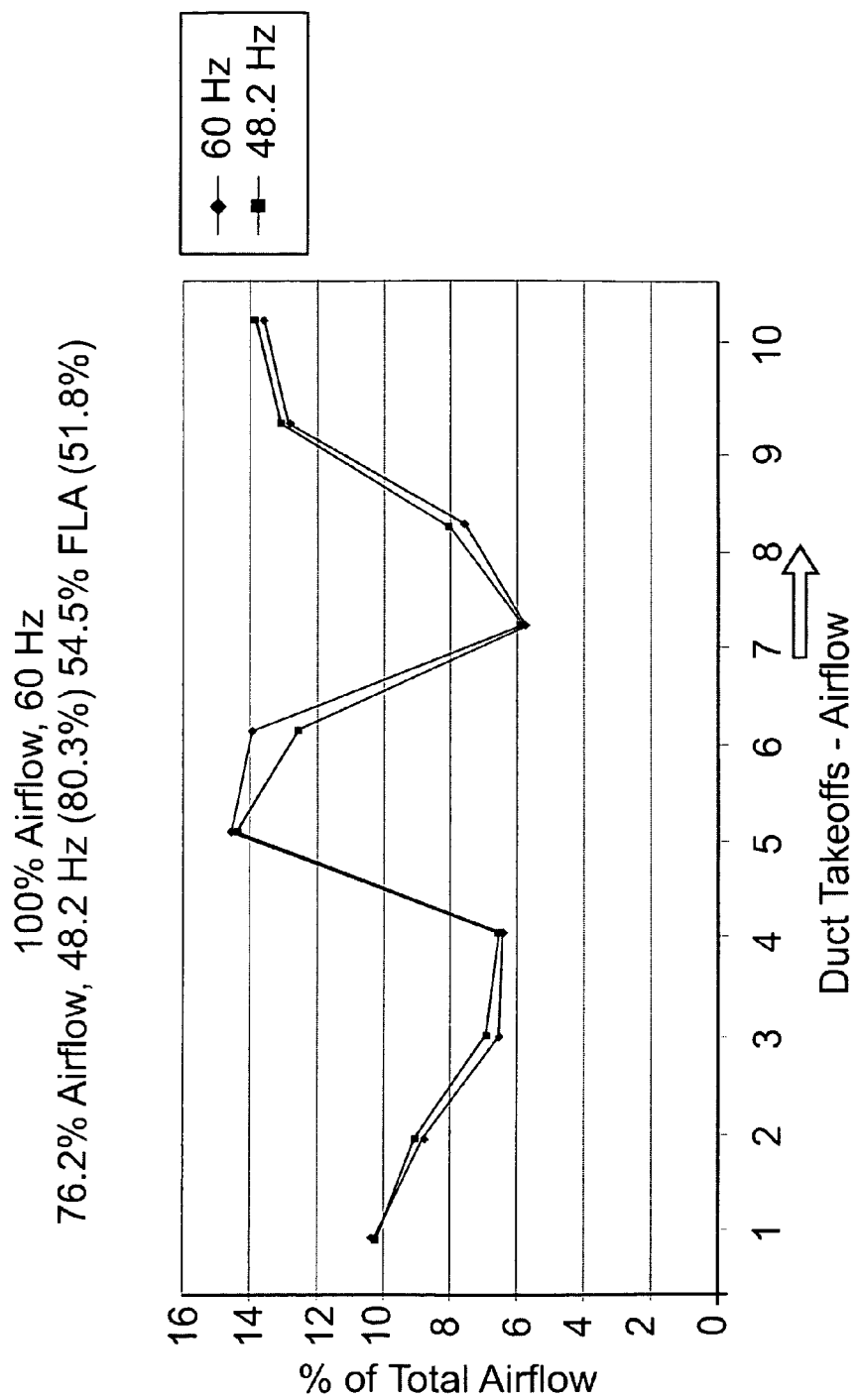
Figure 10:
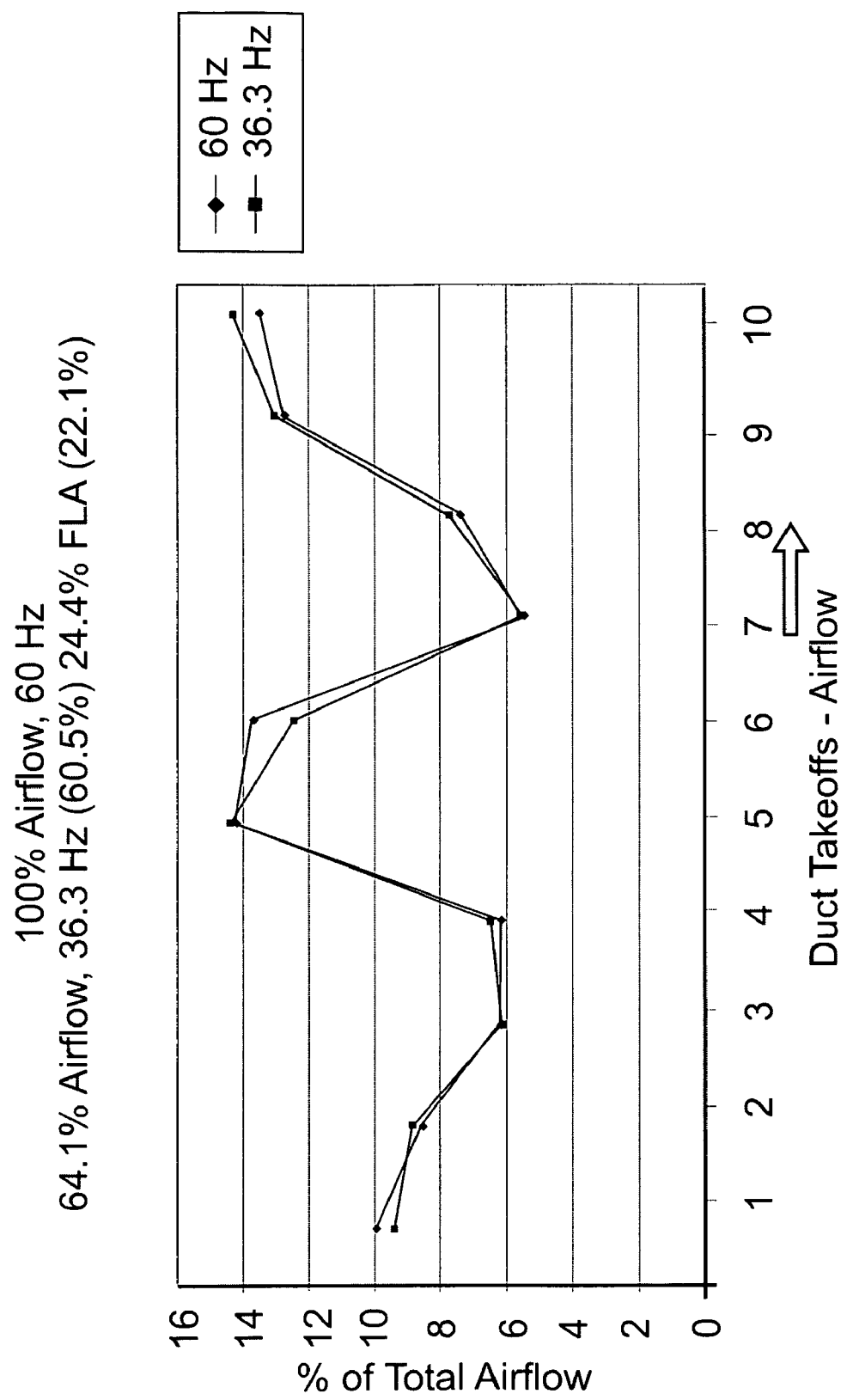
Figure 11:
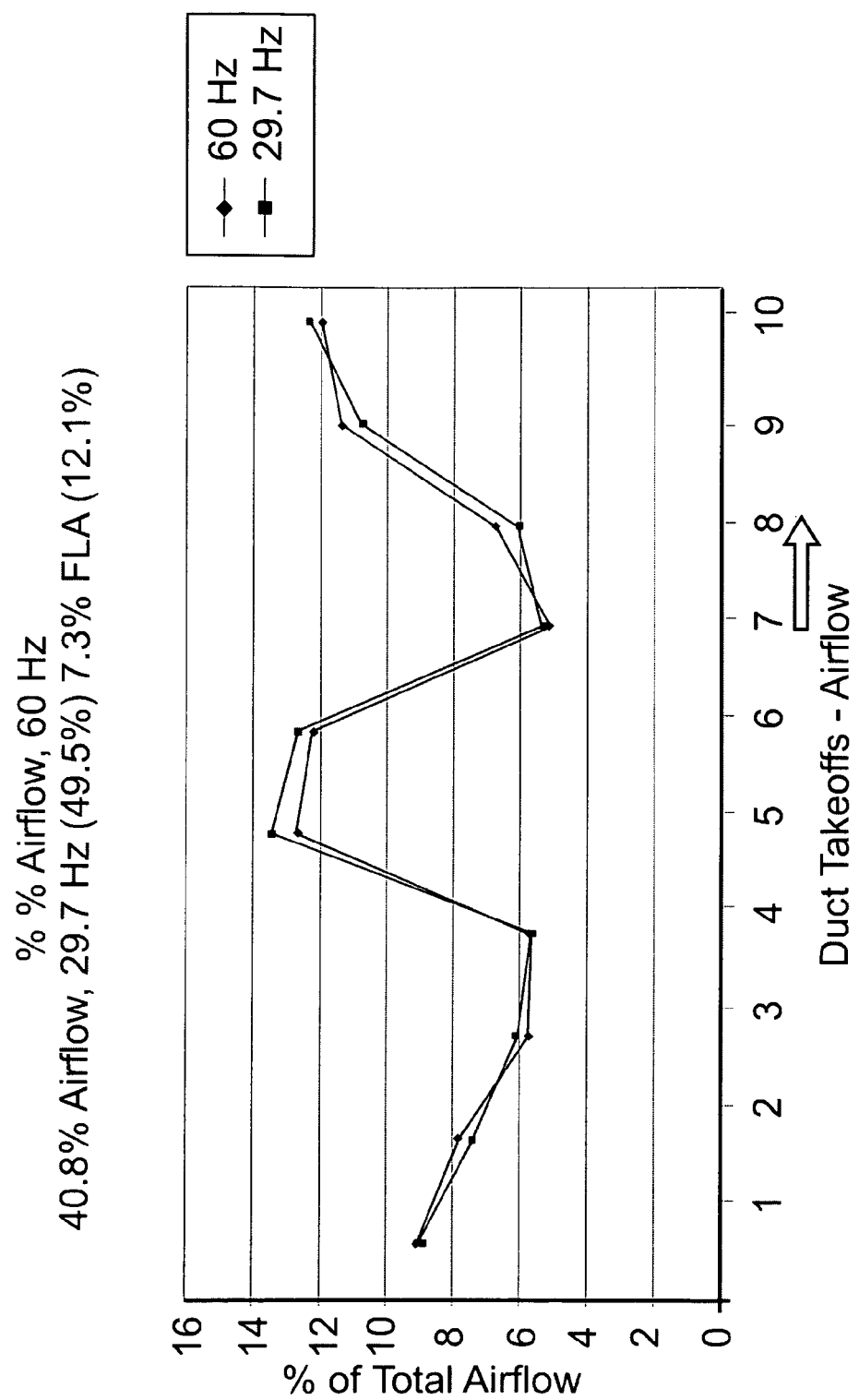
Figure 12:
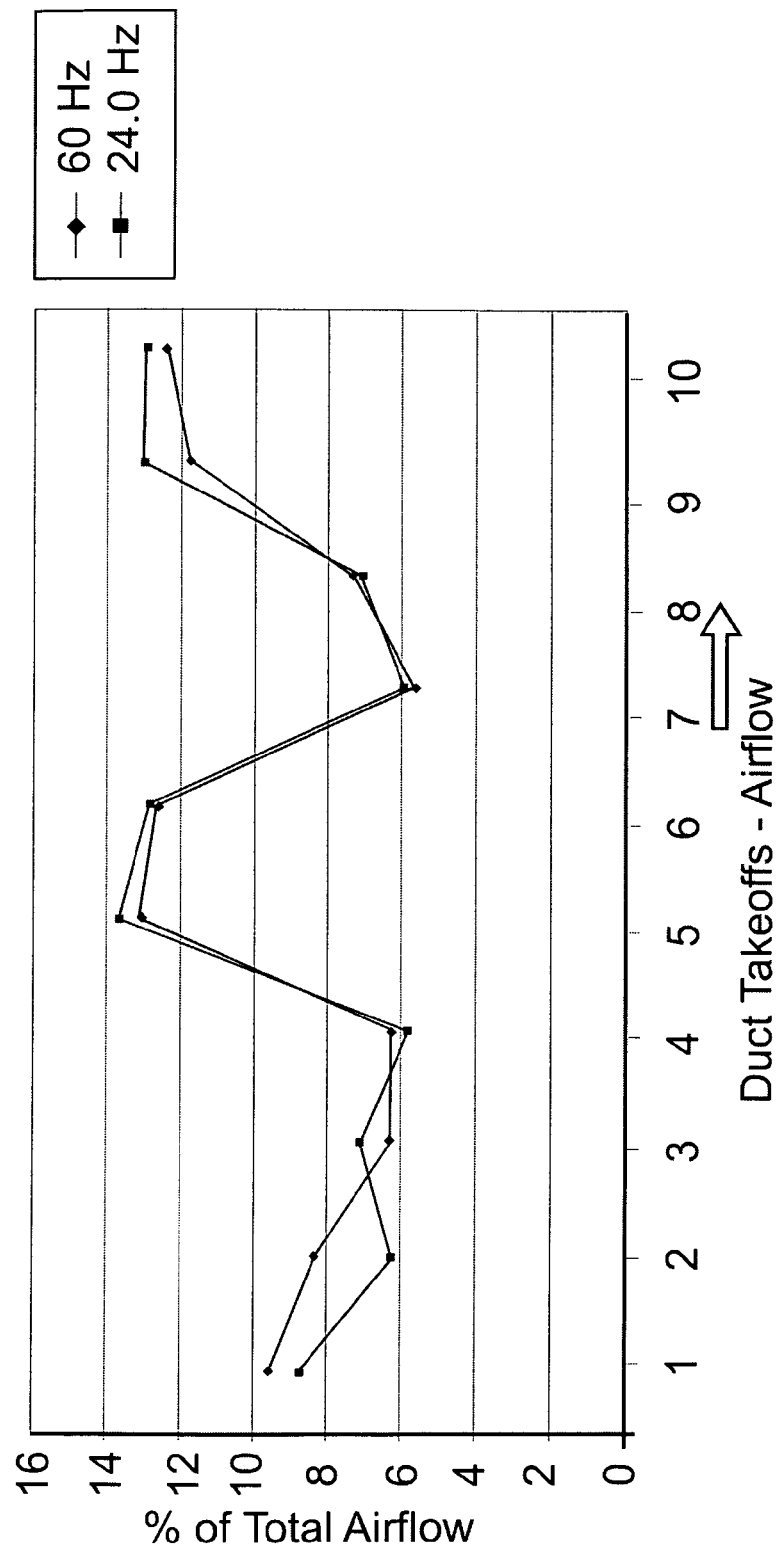

Referring now to FIG. 7 for pertinent data, the energy saving potential of the present invention may be calculated. Assume a nominal 15 ton rooftop unit with dual compressors and a face-split evaporator coil; 4700 cfm maximum airflow; 20% outside air makeup; 95° F. dry bulb, 76° F. wet bulb outside design conditions; 72° F. dry bulb, 50% relative humidity indoor design conditions; indoor sensible heat ratio (SHR) of 0.95; and a total cooling capacity of 181,000 Btu/hr. At full cooling load coincident with indoor and outdoor design conditions, the mixed air temperature entering the cooling coil would be 76.6° F. dry bulb and 64.0° F. wet bulb. At a 0.95 SHR, the leaving evaporation temperature would be 51.0° F. dry bulb and 50.8° F. wet bulb.

Assume that at partial cooling load conditions, the outdoor temperature is 85° F. dry bulb and 76° F. wet bulb (a warm, muggy day), and also assume that the indoor conditions are such that one stage of cooling is on and one stage of cooling is off. The following is a comparison of a conventional rooftop heating/cooling system to a rooftop heating/cooling system having the present invention retrofit with one stage of cooling on.

|  | Conventional System | Present Invention |
|---|---|---|
| Supply Air cfm | 4,700 cfm | 2350 cfm |
| Outside Air Quantity | 940 cfm | 470 cfm |

-continued

|  | Conventional System | Present Invention |
|---|---|---|
| Outside Air Load (OA) | 55,455 Btu/hr | 27,728 Btu/hr |
| Fan Heat Load | 11,946 Btu/hr | 1,502 Btu/hr |
| Compressor KW for OA | 4.25 KW | 2.13 KW |
| Compressor KW for Fan Heat | .92 KW | .16 KW |
| Supply Fan KW | 3.51 KW | .44 KW |
| Total Compressor and Supply Fan KW | 8.68 K | 2.73 KW |
| Supply Fan Only | 4.43 KW | .60 KW |

Thus, when the effect of outside air on the entire A/C system is considered, the energy consumption of the present invention system is almost 70% less than the conventional system. Moreover, when only the supply fan saving is considered, the present invention reduces the energy consumption over 85%.

Airflow reduction has two positive effects on the airflow distribution system. First, airflow noise is reduced substantially when airflow is reduced, which is much less distracting to occupants. Second, occupant comfort is improved because drafts caused by high velocity discharge air are reduced. This is especially important in the heating and ventilating modes.

It is important to note that when the airflow is reduced, the air distribution throughout the system is proportional to the air distribution at maximum airflow. If the air distribution did not remain proportional at reduced airflow, hot spots and cold spots in the conditioned space could result in creating occupant discomfort. To understand what is meant by the proportional air distribution, consider this example. If a diffuser in the system is delivering 12% of the total airflow at maximum total airflow, then it will still deliver 12% of the total airflow at 50% of total airflow. The reason the reduced airflow remains proportional is that reduced airflow effectively makes ductwork oversized which is sometimes referred to in the HVAC industry as the "plenum effect." To explain the "plenum effect" in a duct, consider the following:

1. Total Pressure=Static Pressure+Velocity Pressure
2. As the airflow is decreased, the total pressure is decreased.
3. As the total pressure decreases, the static pressure percentage of the total pressure increases and the velocity pressure percentage of the total pressure decreases. If the fan continues to run, but the air is restricted to the point there is no flow (a condition called "Block Tight Static Pressure"), the velocity pressure is zero and therefore the total pressure equals the static pressure.

Figure 13:
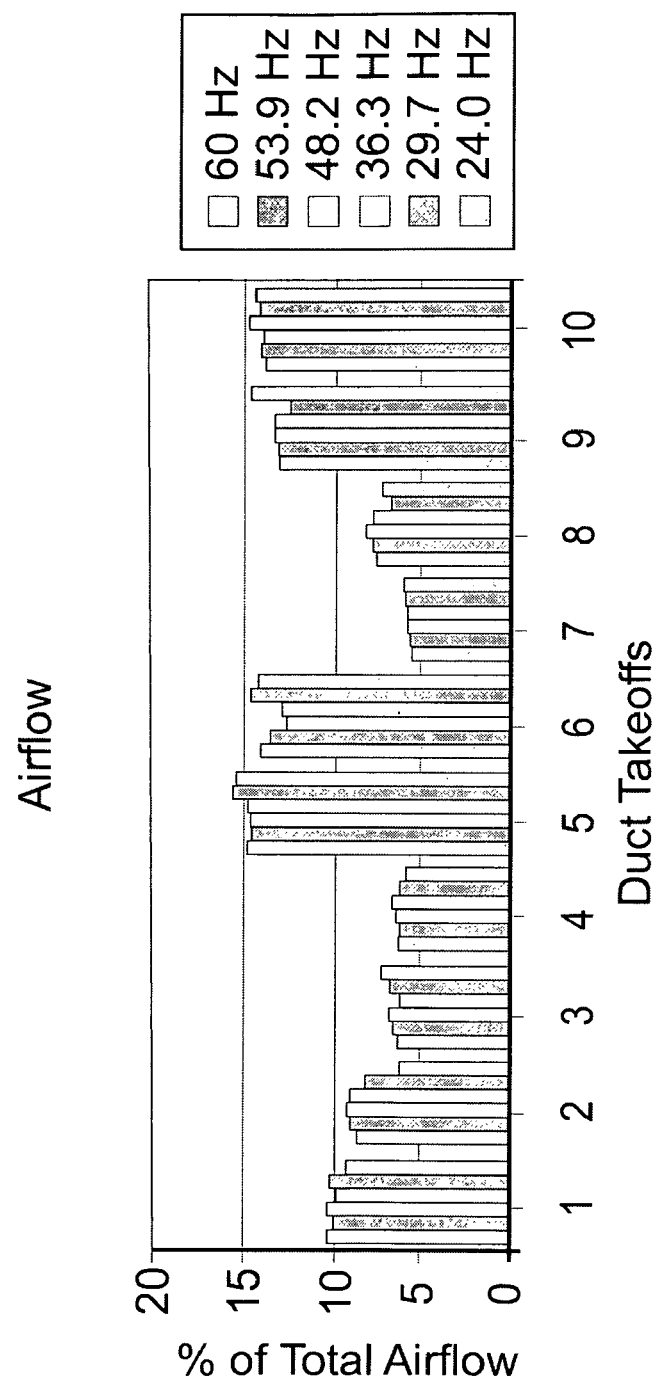
FIG. 13 is a chart summarizing the results of graphs 5-9.

A field test was conducted to verify the above theory. A 100-foot long low velocity duct with ten outlets was selected for the test. The duct was designed at 0.08 inches of water column per 100 equivalent feet of duct using the equal friction duct design method. Thermal anemometers were used to read the airflow at each of the ten outlets. The thermal anemometers were calibrated using a calibrated airflow hood. The airflow at each outlet was logged starting with a fan motor running at 60 HZ or 100% airflow. The fan speed was then reduced by the controller of the present invention in approximately 10% increments down to 40% of total airflow. Finally, the airflow values were logged at each outlet each time the speed was reduced. Referring to FIGS. 8-12, the percentage of total airflow at each outlet was then plotted for each fan speed versus maximum airflow. Referring to FIG. 13, the results were then summarized.

The data showed that the percentage of airflow at each outlet was essentially constant regardless of the airflow.

Because the airflow distribution does remain proportional as the airflow is reduced, varying the airflow according to the present invention should not result in the creation of hot spots or cold spots, and the comfort levels should remain consistent with those at 100% airflow.

Uniquely, the present invention takes into account the evaporator refrigerant coil circuiting to insure that the evaporator leaving air conditions are consistent at all stages of cooling. Conventional rooftop air conditioning units have elevated evaporator leaving air temperature at partial cooling load, which causes the relative humidity of the space served by the unit to become elevated. This rise in relative humidity causes several problems including discomfort of the people occupying the space and potential indoor air quality problems in the form of mold and mildew. By contrast, the present invention maintains the relative humidity of the space at a lower level, and thus the evaporation rate of the perspiration on the skin of the occupants in the space increases. This increased evaporation rate allows the temperature set point of the space to be raised but still maintain a consistent level of comfort. Raising the set point results in compressor energy savings. Moreover, the potential for mold and mildew growth, which generally occurs above 60% relative humidity, is essentially eliminated. Thus, in addition to dramatically reducing the energy consumption at part load, the present invention will beneficially reduce the relative humidity of the space being served by as much as 20% depending on the volume of outside air and outdoor air temperature and humidity conditions.

In cases where there is a high density of people in the space and this density is variable, the present invention permits the outside air ventilation to vary in proportion to the supply air quantity. This allows additional significant compressor operating cost savings at partial cooling load as well as reduced relative humidity in the space in the dead band and heating modes.

Because the present invention causes the evaporator fan and fan motor to operate at reduced speeds for extended periods of time, the fan belt life, fan bearing life, and motor bearing life are almost doubled. Further, the frequency of lubricating these bearings and changing or tightening the belts can be reduced by almost half, which saves replacement bearings, belts, and associated maintenance costs. In addition, an inherent characteristic of the present invention is that when it starts the supply fan, it slowly ramps up the speed of the motor (soft start) as opposed to taking the motor from "OFF" to full speed instantly. The instantaneous starting of a motor requires the motor to produce significant starting torque. This starting torque shortens the life of the fan and motor bearings and especially shortens the life of the fan belt. Soft starting greatly reduces the starting torque and extends the life of all of these components.

Additional benefits afforded by the present invention's reduced airflow include both maintenance cost benefits and improved indoor air quality. These benefits are derived from the reduced airflow for extended periods of time across the forced air heating/cooling system filters. When less air is being moved, the filter life is extended, which saves maintenance costs. Additionally, reducing the airflow across the filters increases the filtration efficiency of the filters, further improving the indoor air quality of the conditioned space served by the forced air heating/cooling system.

Figure 14:
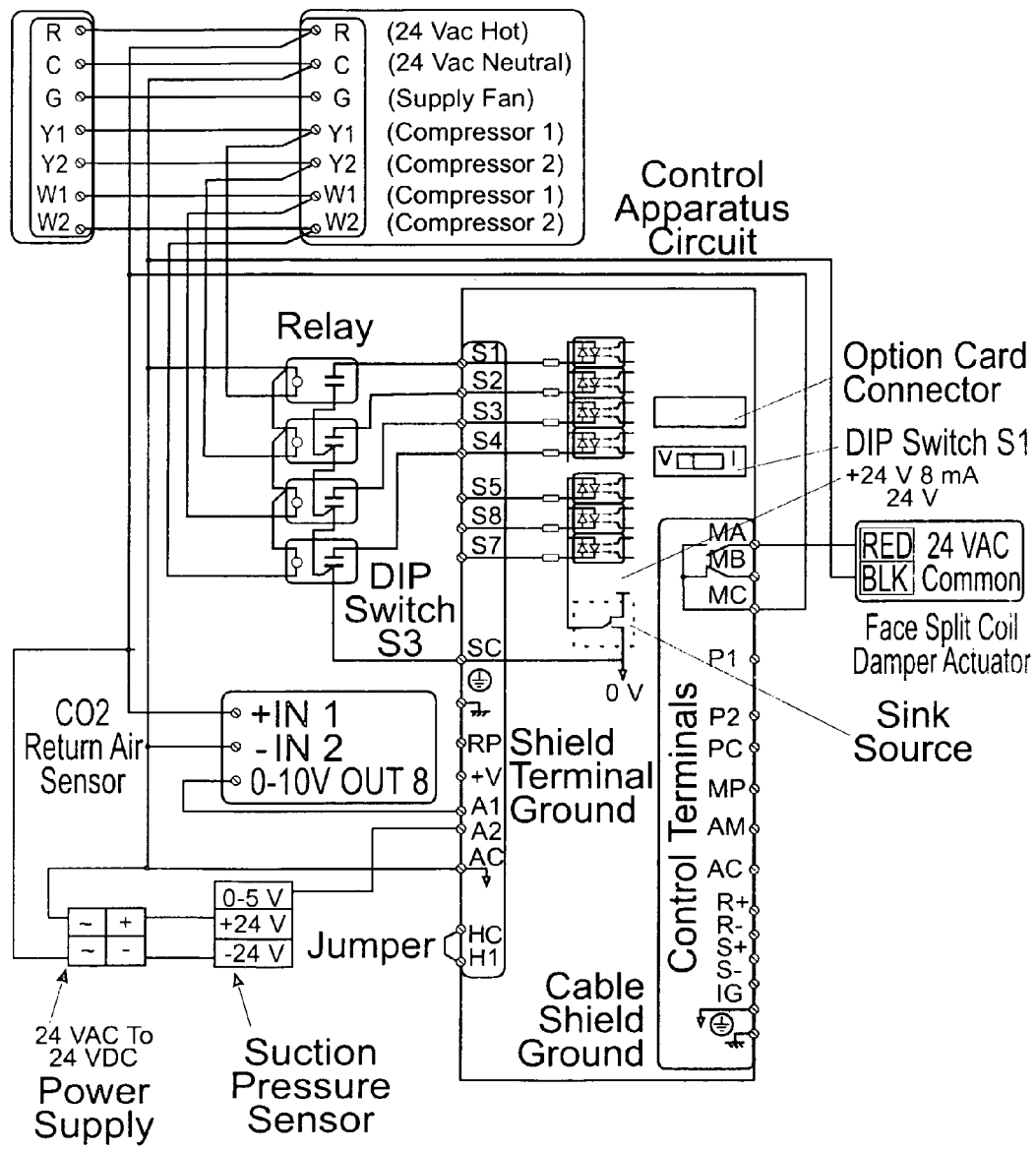
FIG. 14 is a wiring diagram for the present invention with face-split coils and demand ventilation for use with an existing thermostat or control system.
Figure 15:
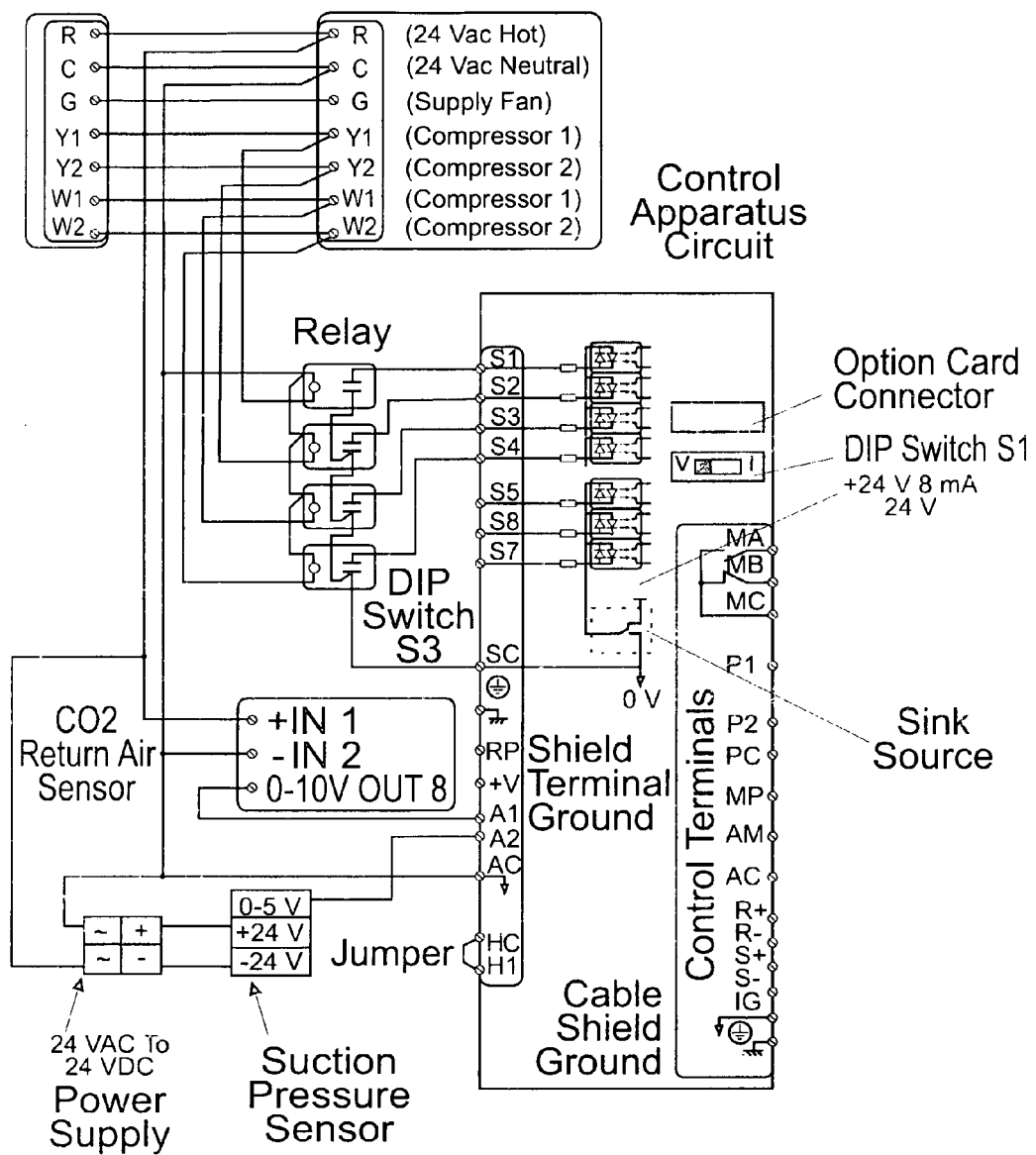
FIG. 15 is a wiring diagram for the present invention with interlaced coils and demand ventilation for use with an existing thermostat or control system.

The operation of the control systems to vary the speed of a fan motor for a forced air heating/air system for the advantageous purposes set forth herein is believed to be understandable to those of ordinary skill in the art based on the foregoing description. Wiring diagrams for the first and second preferred embodiments, respectively, are presented in FIGS. 14 and 15.

The benefits of the instant invention are many, and include the following: (1) reduced supply fan energy consumed during a high percentage of operating hours; (2) reduced compressor energy consumed by reducing fan heat; (3) reduced compressor energy consumed by reducing outside air load; (4) reduced relative humidity at partial loads which increases comfort and reduces chance of mold and mildew growth; (5) reduced heating energy consumed by reducing outside air load; (6) lower airflow sound levels at partial loads; (7) reduced maintenance cost by reducing the preventative maintenance of fans, motors, and filters; (8) increased component life of supply fan motor bearings, fan hearings, and fan belts; (9) improved indoor air quality by lowering relative humidity and improving filtration; (10) increased comfort for occupants by reducing drafts in ventilation and heating modes; and (11) ability to control $CO_2$ levels in the space. Further, the present invention is the only single-zone rooftop retrofit design that provides (1) variable airflow in the cooling mode as well as heating and ventilation modes, and (2) demand ventilation control. Moreover, the present invention employs variable airflow control for face split DX coils using face dampers; variable airflow control for interlaced DX coils using suction pressure/variable airflow control; and demand ventilation control utilizing variable supply fan airflow. Although preferred embodiments of the invention have been described in detail herein, those skilled in the art will also recognize that various substitutions and modifications may be made without departing from the scope and spirit of the appended claims.

What is claimed is:

1. A retrofit control system for controlling the speed of a fan motor for a forced air conditioning system having interlaced coils operable in heating, ventilation, deadband, and part load cooling modes, respectively, to control supply for speed during operation of said air conditioning system to reduce energy consumption, and provide $CO_2$ air quality control, said control system comprising:
    (a) a suction [/] pressure sensor located on a suction refrigerant line exiting a direct expansion cooling coil;
    (b) a control mode input relay digital input circuit;
    (c) a power output circuit for controlling the speed of said motor as a function of said output signal to vary the speed of said motor in accordance with a control mode input signal;
    (d) a $CO_2$ analog sensor in either the conditioned space or in the return air stream; and
    (e) a heating operation and cooling operation selection circuit operably connected to said power output circuit and input relay circuit and suction [/] pressure sensor for varying the air flow in each of the cooling, heating, and ventilation deadband modes, controlling refrigerant suction pressure, and modulating the ventilation rate as required to maintain a maximum of 1000 ppm of $CO_2$.

2. The control system of claim 1, wherein said control system is preprogrammed to match a specific brand and model of air conditioning system based on the cooling and heating capacity of said system.

3. The control system of claim 1, wherein the heating operation and cooling operation selection circuit produces a variable 0-10 VDC output signal to modulate the ventilation air damper as required to keep the $CO_2$ concentration as measured by a $CO_2$ monitor below set point.

4. The control system of claim 1, wherein the heating operation and cooling operation selection circuit produces a 0 or 24 VAC signal to either open or close a two-position outside air damper for as long a time period as required to keep the $CO_2$ concentration as measured by a $CO_2$ monitor below set point.

5. The control system of claim 1, wherein the outside air damper is manually set to provide proper ventilation air at maximum occupancy and maximum air flow and modulates the supply fan speed as required to keep the CO2 concentration, as measured by a CO2 monitor, below set point.

6. The control system of claim 1, wherein the speed of the supply fan is slowly accelerated.

7. A control system for controlling the speed of a fan motor for a forced air conditioning system having face split coils operable in heating, ventilation, deadband, and part load cooling modes, respectively, to control supply for speed during operation of said air conditioning system to reduce energy consumption, and provide $CO_2$ air quality control, said control system comprising:
   (a) a suction [/] pressure sensor analog input circuit located on the suction refrigerant line exiting the direct expansion cooling coil;
   (b) a control mode input relay digital input circuit;
   (c) a power output circuit for controlling the speed of said motor as a function of said output signal to vary the speed of said motor in accordance with a control mode;
   (d) a $CO_2$ analog sensor in either the conditioned space or in the return air stream;
   (e) a heating operation and cooling operation selection circuit operably connected to said power output circuit and said input relay circuit and suction [/] pressure sensor for varying the air flow in each of the cooling, heating, and ventilation deadband modes, and modulating the ventilation rate as required to maintain a maximum of 1000 ppm of $CO_2$; and
   (f) an automatic evaporator face damper on the de-energized coil section to prevent air bypass through the de-energized coil face at partial cooling loads.

8. The control system of claim 7, wherein said control system is preprogrammed to match a specific brand and model of air conditioning system based on the cooling and heating capacity of said air conditioning system.

9. The control system of claim 7, wherein the heating operation and cooling operation selection circuit produces a variable 0-10 VDC output signal to modulate the ventilation air damper as required to keep the $CO_2$ concentration as measured by a $CO_2$ monitor below set point.

10. The control system of claim 7, wherein the heating operation and cooling operation selection circuit produces a 0 or 24 VAC signal to either open or close a two-portion outside air damper for as long a time period as required to keep the $CO_2$ concentration as measured by a $CO_2$ monitor below set point.

11. The control system of claim 7, wherein the outside air damper is manually set to provide proper ventilation air at maximum occupancy and maximum air flow and modulates the supply fan speed as required to keep the CO2 concentration, as measured by a CO2monitor, below set point.

12. The control system of claim 7, wherein the speed of the supply fan is slowly accelerated.

13. A method of controlling the speed of a fan motor for a forced air flow air conditioning system operable in heating, ventilation, deadband, and part load cooling modes, respectively, to control supply for speed during operation of said air conditioning system to reduce energy consumption, and provide $CO_2$ air quality control, said method comprising:
   (a) employing a suction [/] pressure sensor analog input circuit located on a suction refrigerant line exiting a direct expansion cooling coil;
   (b) employing a control mode input relay digital input circuit;
   (c) employing a power output circuit for controlling the speed of said motor as a function of said output signal to vary the speed of said motor in accordance with a control mode input signal;
   (d) employing a $CO_2$ analog sensor in either the conditioned space or in the return air stream; and
   (e) employing a heating operation and cooling operation selection circuit operably connected to said power output circuit and said input relay circuit and suction [/] pressure sensor for varying the air flow in each of the cooling, heating, and ventilation deadband modes, controlling refrigerant suction pressure, and modulating the ventilation rate as required to maintain a maximum of 1000 ppm of $CO_2$.

14. The method of claim 13, wherein the heating operation and cooling operation selection circuit produces a variable 0-10 VDC output signal to modulate the ventilation air damper as required to keep the $CO_2$ concentration, as measured by a $CO_2$ monitor, below set point.

15. The method of claim 13, wherein the heating operation and cooling operation selection circuit produces a 0 or 24 VAC signal to either open or close a two-portion outside air damper for as long a time period as required to keep the $CO_2$ concentration, as measured by a $CO_2$ monitor, below set point.

16. The method of claim 13, wherein the outside air damper is manually set to provide proper ventilation air at maximum occupancy and maximum air flow and modulates the supply fan speed as required to keep the CO2 concentration, as measured by a CO2 monitor, below set point.

17. The method of claim 13, wherein the speed of the supply fan is slowly accelerated.

18. A method of controlling the speed of a fan motor for a forced air flow air conditioning system operable in heating, ventilation, deadband, and part load cooling modes, respectively, to control supply for speed during operation of said air conditioning system to reduce energy consumption, and provide $CO_2$ air quality control, said method comprising the steps of:
   (a) employing a suction [/] pressure sensor analog input circuit located on a suction refrigerant line exiting a direct expansion cooling coil;
   (b) employing a control mode input relay digital input circuit;
   (c) employing a power output circuit for controlling the speed of said motor as a function of said output signal to vary the speed of said motor in accordance with a control mode input signal;
   (d) employing a $CO_2$ analog sensor in either the conditioned space or in the return air stream; and
   (e) employing a heating operation and cooling operation selection circuit operably connected to said power output circuit and said input relay circuit and suction [/] pressure sensor for varying the air flow in each of the cooling, heating, and ventilation deadband modes, and modulating the ventilation rate as required to maintain a maximum of 1000ppm of $CO_2$; and
   (f) employing an automatic evaporator face damper or de-energized coil section to prevent air bypass through the de-energized coil face at partial cooling loads.

19. The method of claim 18, wherein the heating operation and cooling operation selection circuit produces a variable 0-10 VDC output signal to modulate the ventilation air damper as required to keep the $CO_2$ concentration, as measured by a $CO_2$ monitor below, set point.

20. The method of claim 18, wherein the heating operation and cooling operation selection circuit produces a 0 or 24 VAC signal to either open or close a two-portion outside air damper for as long a time period as required to keep the $CO_2$ concentration, as measured by a $CO_2$ monitor, below set point.

21. The method of claim 18, wherein the outside air damper is manually set to provide proper ventilation air at maximum occupancy and maximum air flow and modulates the supply fan speed as required to keep the CO2 concentration, as measured by a CO2 monitor, below set point.

22. The method of claim 18, wherein the speed of the supply fan is slowly accelerated.

* * * * *